United States Patent
Chijuma et al.

[11] 3,805,066
[45] Apr. 16, 1974

[54] SMOKE DETECTING DEVICE UTILIZING OPTICAL FIBERS

[76] Inventors: Toichi Chijuma, No. 4-11-9-703, Sendagaya, Shibuya-ku, Tokyo; Yoshio Morita, No. 3-9-2, Hachobari, Chuo-ku, Tokyo, both of Japan

[22] Filed: Aug. 14, 1972

[21] Appl. No.: 280,204

[52] U.S. Cl. .............. 250/227, 250/218, 340/237 S, 350/96 R
[51] Int. Cl. ............................................. G02b 5/14
[58] Field of Search.................. 250/227, 218, 221; 350/96 R, 96 B; 340/237 S; 356/207, 208

[56] References Cited
UNITED STATES PATENTS

| | | | |
|---|---|---|---|
| 3,255,441 | 6/1966 | Goodwin | 250/218 X |
| 3,504,184 | 3/1970 | Eaton | 250/227 |
| 3,647,300 | 3/1972 | Skala | 250/218 |
| 3,619,068 | 11/1971 | Boerman | 250/218 |
| 3,168,218 | 2/1965 | Funk | 250/218 |
| 2,877,453 | 3/1959 | Mendenhall | 250/227 |
| 3,102,257 | 8/1963 | Miller | 340/237 |

Primary Examiner—James W. Lawrence
Assistant Examiner—D. C. Nelms
Attorney, Agent, or Firm—Wenderoth, Lind & Ponack

[57] ABSTRACT

A smoke detecting device utilizing optical fibers is composed of a required number of optical fibers arranged in series alignment with gaps provided therebetween, a light source introducing light rays through one end of the first of the serially arranged optical fiber to the interior thereof, a photo-electric transducer for receiving light rays passed through the optical fibers and delivered from the end of the last of the serially arranged optical fiber to convert the amount of light thus received into an electric quantity, and a discriminating circuit which produces a predetermined electric signal for indicating the detection of fire whenever the variation of the electric quantity thus obtained exceeds a preset value, whereby any variation in the amount of light due to the intervention of smoke into the gaps between the optical fibers is detected electrically thereby to obtain an electric signal.

3 Claims, 2 Drawing Figures

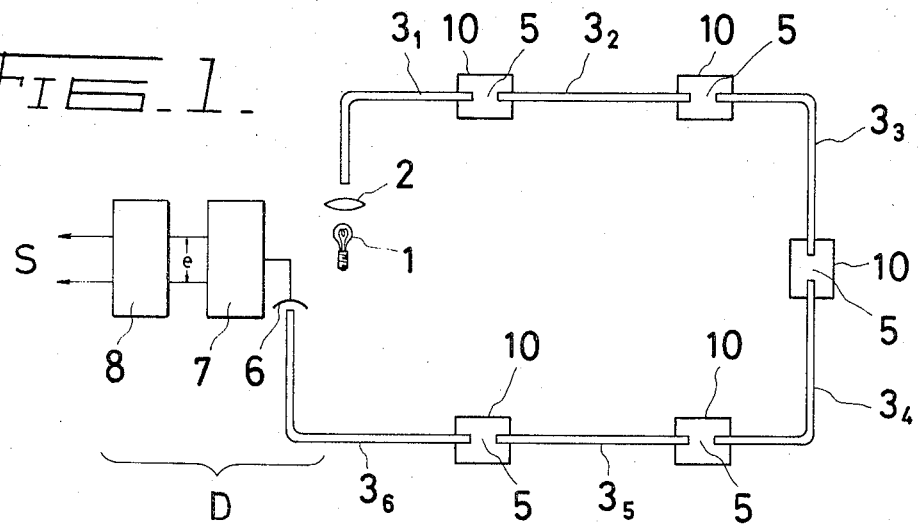
FIG_1.
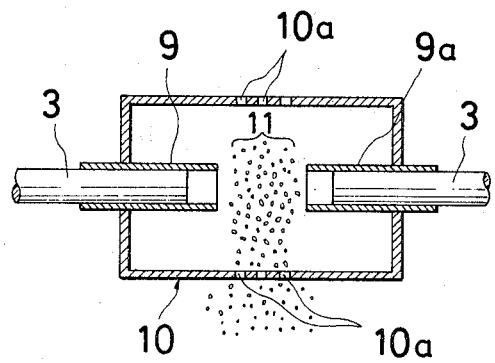
FIG_2.

SMOKE DETECTING DEVICE UTILIZING OPTICAL FIBERS

BACKGROUND OF THE INVENTION

This invention relates to a smoke detecting device of a type comprising means for projecting light rays and an actinometric device receiving the light rays from the projecting means and detecting the intensity of radiation along the optical axis of the latter, whereby any variation in the intensity caused by the smoke intruded into the optical axis is electrically detected, and when the variation exceeds a predetermined value, an electric signal for alarming fire is thereby produced.

Heretofore, it was well known to construct a smoke detecting device having a means for projecting light rays, a photo-transistor forming a part of the actinometric device disposed opposite the light projecting means for receiving the light rays directly and converting the intensity thereof into an electric quantity, and a discriminating device for producing an electric signal when the variation of the electric quantity received from the actinometric device exceeds a predetermined value, wherein the light projecting means and the photo-transistor are so arranged that smoke can be introduced therebetween, and upon the intrusion of smoke, the above-mentioned electrical signal is sent to operate any of the fire alarming devices.

However, this conventional smoke detecting device has possessed a drawback in that there is only a single gap between the light projecting means and the photo-transistor, wherein smoke can be detected, that is there is only one gap for each smoke detecting device. consequently when smoke is desired to be detected at a plurality of positions, a corresponding number of smoke detecting devices must be employed. This entailing a further drawback because smoke detection at a plurality of positions being impossible to be achieved by a single detector.

SUMMARY OF THE INVENTION

Therefore, a primary object of the present invention is to provide a smoke detecting device utilizing a plurality of optical fibers, whereby smoke can be detected at a plurality of positions employing a single unit of the smoke detecting device.

Another object of the invention is to provide a smoke detecting device of a simple construction and economical in manufacture.

Still another object of the invention is to provide a smoke detecting device of high sensitivity and reliable in operation.

These and other objects of the present invention can be achieved by a smoke detecting device utilizing optical fibers, comprising a required number of optical fibers aligning in series, a light source for injecting light rays through one end of the first optical fiber in the series to the interior thereof, a photo-electric transducer for receiving light rays that are passed through the optical fibers, which are aligned with each other but are separated by intermediate gaps, and for converting the amount of the light rays thus received into an electrical quantity, and a discriminating circuit which produces a predetermined electric signal for indicating the detection of smoke whenever the variation of the electric quantity thus obtained exceeds a preset value, whereby the variation of the amount of light rays caused by the intervention of smoke into the gaps is detected electrically to obtained the electrical signal.

The nature, principle, and the utility of the present invention will be more clearly understood from the following detained description of the invention when read in conjunction with the accompanying drawing.

BRIEF DESCRIPTION OF THE DRAWING

In the drawing:

FIG. 1 is a schematic diagram showing the outline of a smoke detecting device according to the present invention; and FIG. 2 is a sectional view showing, in a much enlarged scale, a construction of an aligning provision of two confronting ends of optical fibers.

DETAILED DESCRIPTION OF THE INVENTION

Referring now to FIG. 1, a plurality of optical fibers $3_1$ through $3_6$ are arranged in series, with the ends of successive fibers being aligned but separated by gaps 5 of several millimeters distance, so that the entire optical fiber system extends generally in a rectangular configuration along the surface of the ceiling of a chamber. The diameter of the optical fibers $3_1$ through $3_6$ is selected to be for instance 1 millimeter.

The optical fibers $3_1$ through $3_6$ are not required to be extended straight, but they may be curved in accordance with the extended surface as long as the confronting or adjacent ends thereof are aligned with each other. With such an arrangement of the optical fibers, incident light rays on the end of the first optical fiber can be effectively transmitted through the rest of the optical fibers and the gaps interposed therebetween. The provisions for aligning the ends of the optical fibers $3_1$ through $3_6$ are all of a similar construction as shown in FIG. 2.

In the construction, there is provided a box 10 having two end walls at the right and left sides thereof. Cylindrical holders 9 and 9a are provided through these two end walls, and corresponding ends of the optical fibers $3_1, 3_2, 3_3, \ldots$ are passed through the cylindrical holders 9 and 9a, so that the confronting ends of the optical fibers are aligned with each other with a gap 5 formed therebetween.

In the central portions of the opposite pair of walls of the box 10, a number of ventilation holes 10a are bored, so that any smoke occurring in the chamber may be introduced into the box 10 through the ventilation holes 10a. The smoke 11 is introduced into the box 10 and interrupts the light rays passing through the gap 5, thus diminishing the intensity of the light transferred through the remainder of the serially aligned optical fibers.

On one end of the first optical fiber $3_1$ of the serially arranged optical fibers $3_1$ through $3_6$, there are projected light rays from a lamp 1, constituting a light source, condensed into a light beam through a lens 2. The light rays thus introduced into the optical fiber $3_1$ are totally reflected by the surrounding wall of the optical fiber $3_1$ to be passed to the other end of the optical fiber. The ligh rays are then passed through the gap 5 between the ends of the optical fibers $3_1$ and $3_2$ to the interior of the optical fiber $3_2$, and the procedure is repeated until the light rays are delivered from the terminal end of the optical fiber $3_6$.

Opposite the terminal end of the optical fiber $3_6$, there is provided a photo-transistor 6 constituting an actinometric device for converting the amount of light rays thus received into an electric quantity. In this example, the photo-transistor 6 forms one part of a photo-electric transducer 7 which converts the amount of light into a voltage e as is well known in the art.

A discriminator circuit 8 is connected to the photoelectric transducer 7, and the output of the photoelectric transducer 7 is discriminated with respect to its value in the discriminator circuit 8. More specifically, the discriminator circuit 8 delivers a predetermined electric signal S representing detection of fire when the voltage e exceeds a predetermined level. The electric signal S may take various forms. For example the discriminator may normally produce no signal but produce a voltage S when the voltage e exceeds a preset level, or a predetermined electric signal normally maintained may be abruptly changed to zero when the voltage e exceeds the present level. Still another form may be used wherein the level of the signal is changed from a value to another value (neither value being zero) when the voltage exceeds the preset level.

It should be noted that the light projecting means consisting of a lamp 1 and a lens 2, the photo-electric transducer 7 including a photo-transistor 6, and the discriminator circuit 8 are consolidated into one unit D which is placed outside of a chamber wherein the detection of smoke is required to be carried out.

When smoke intrudes in one or more of the gaps 5 between the optical fibers $3_1$ through $3_6$ through which light rays are normally transmitted, the light rays are in some extent reduced their amount by the smoke, whereby the amount of light received by the phototransistor 6 which has been receiving a constant amount of light, will be reduced, and the voltage e of the output from the photo-electric transducer 7 will also be reduced in corespondence with the reduction in the light rays.

Thus, when the variation of the voltage e, that is, the variation in the amount of light received by the phototransistor exceeds a preset level, the above described predetermined electric signal S is delivered from the discriminator circuit 8. This predetermined electric signal S actuates a required fire alarm device (not shown) consisting, for instance, of a buzzer or a blinking lamp.

Although six optical fibers $3_1$ through $3_6$ have been employed in the above described example of the smoke detecting device in a manner forming five gaps 5 therebetween with each gap enabling to detect the occurrance of smoke in a different position, it will be apparent to the skilled in the art that the invention is not limited by such a construction. That is, the number of the optical fibers may be changed to two, in the least case, forming a single gap therebetween for detecting smoke at one position, or to any other number. In any case, the smoke detections at the corresponding number of positions can be carried out collectively employing a single light source, photo-electric transducer, and a single electric quantity discriminator circuit.

As will be apparent from the above description, according to the present invention, a smoke detecting device is so composed that a light transmitting path is formed by a required number of optical fibers arranged in series alignment leaving gaps therebetween, the maount of light transmitted and received at the terminal end of the light transmitting path is detected by a photo-electric transducer, and when the amount of light thus detected is decreased to a predetermined value due to the intervention of smoke in the gaps, a predetermined electrical signal is obtained from a discriminating circuit connected to the photo-electric transducer, whereby smoke detections at a plurality of positions can be collectively carried out employing a single light source, photo-electric transducer, and a single electric quantity discriminator circuit.

Furthermore, since the series arranged optical fibers can achieve a function resembling to a kind of electric wiring, the fibers are utilized as a substitute of the electric wiring in a smoke detecting device wherein the smoke detection is carried out collectively by means of the electric wiring, whereby the smoke detecting device can be realized economically.

I claim:

1. A smoke detecting device, comprising:
    a plurality of optical fibers including a first optical fiber having a free end and a coupled end, a last optical fiber having a free end and a coupled end and intermediate optical fibers having two coupled ends in serial alignment and each pair of consecutively aligned optical fibers defining a gap between the adjacent coupled ends thereof;
    a light source and focusing means positioned opposite the free end of the first of the serially aligned optical fibers for introducing light rays into the first optical fiber for transfer through the serially arranged optic fibers;
    a coupling means operatively positioned between each of the adjacent optical fibers and firmly retaining the ends thereof in proper alignment and maintaining the gap therebetween, the coupling means defining a plurality of apertures appropriately positioned to allow smoke to enter therein and to pass through the gap between the adjacent ends of coupled optical fibers, diminishing the amount of light transferred from one optical fiber to the adjacent optical fiber in direct relation to the amount of smoke in the gap;
    a photoelectric transducer means operatively positioned for receiving light transmitted through the serially arranged optical fibers and delivered from the unconnected end of the last optical fiber to convert the light received into an electrical voltage; and
    a discriminator circuit operatively connected to the photoelectric transducer means for producing a pre-determined electric signal for indicating the detection of smoke whenever the variation of the electrical voltage caused by the diminution of received light due to the presence of smoke in the gaps exceeds a preset value.

2. The device of claim 1 wherein the light projecting means, the photoelectric transducer means and the discriminator circuit comprise a single unit.

3. The device of claim 2 wherein the connecting means comprises a box having end walls and longitudinal walls placed at each junction of two adjacent optical fibers, said box having a cylindrical optical fiber holder extended inwardly from each of the centers of two end walls of the box in a manner that the two cylindrical holders are aligned in the axial direction of the box, said box further having ventilation holes through the central portion of the longitudinal walls for introducing smoke into the box, and said two cylindrical holders maintaining the two optical fibers in their positions so that a predetermined length of gap is provided between the ends of the two optical fibers.

* * * * *

UNITED STATES PATENT OFFICE
CERTIFICATE OF CORRECTION

Patent No. 3,805,066            Dated April 16, 1974

Inventor(s) TOICHI CHIKUMA and YOSHIO MORITA

It is certified that error appears in the above-identified patent and that said Letters Patent are hereby corrected as shown below:

Correct the name of the inventor "Toichi Chijuma" to

-- Toichi Chikuma --

Signed and sealed this 13th day of August 1974.

(SEAL)
Attest:

McCOY M. GIBSON, JR.         C. MARSHALL DANN
Attesting Officer           Commissioner of Patents